Figure 1:
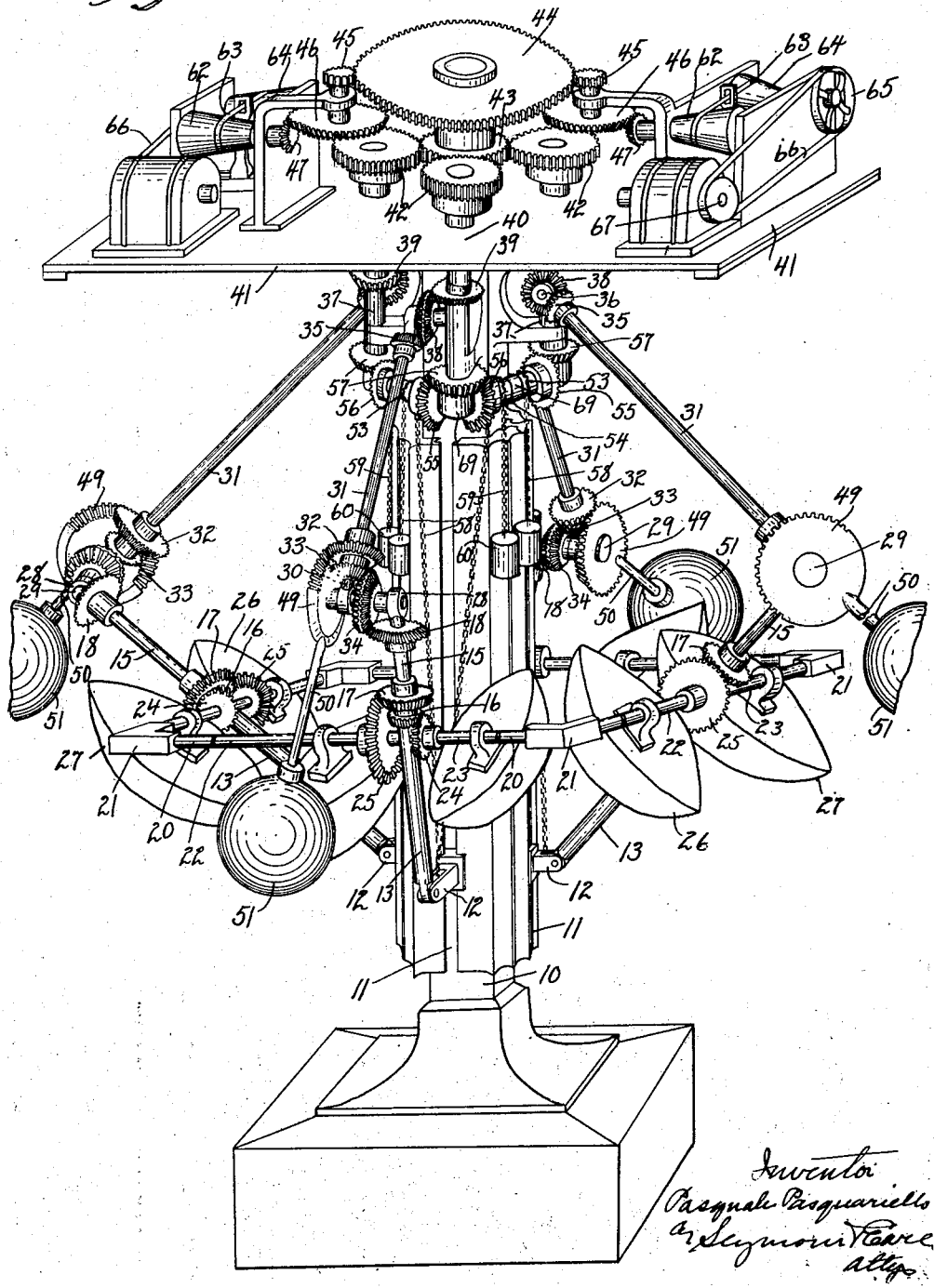

Mar. 3, 1925.  
P. PASQUARIELLO  
WAVE AND TIDE MOTOR  
Filed Sept. 29, 1924

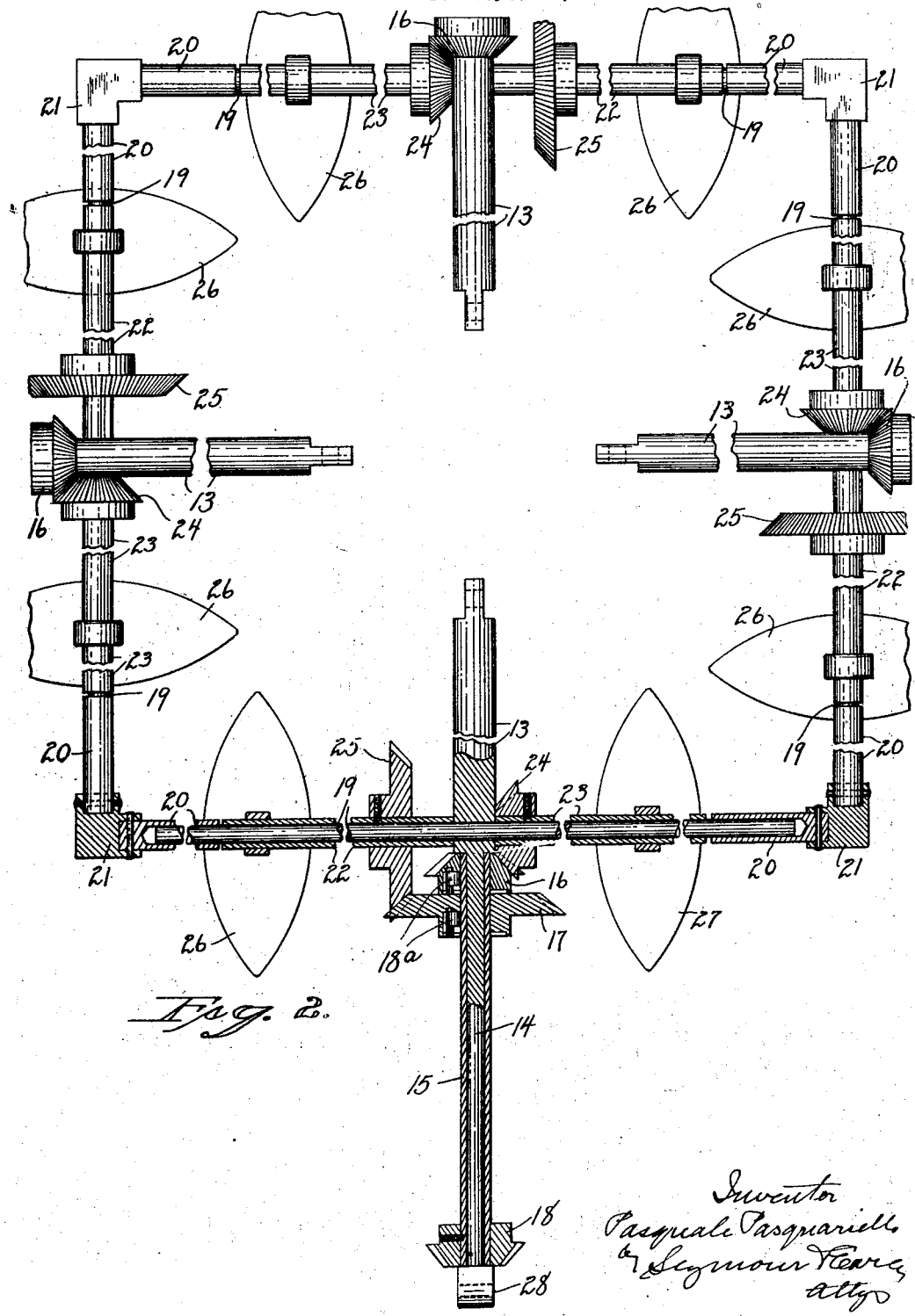

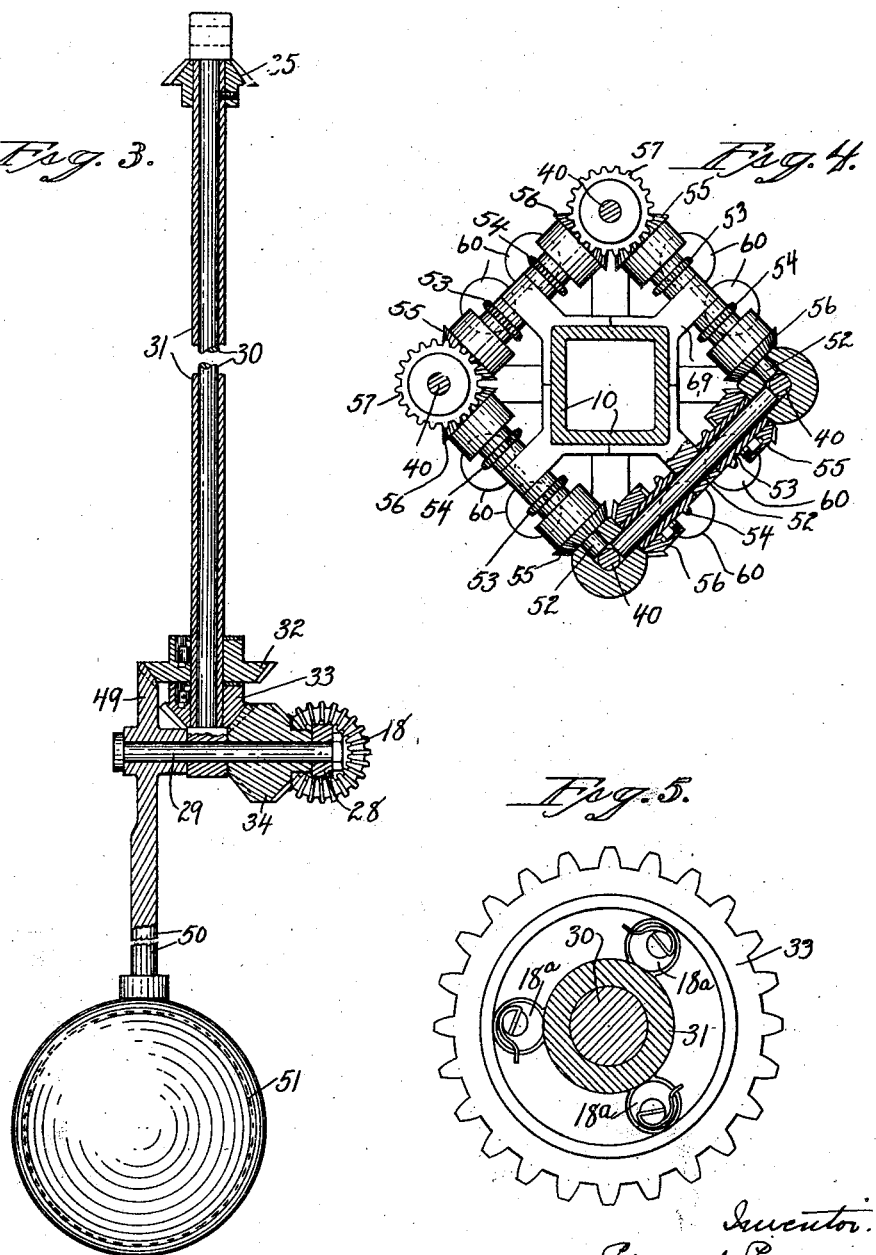

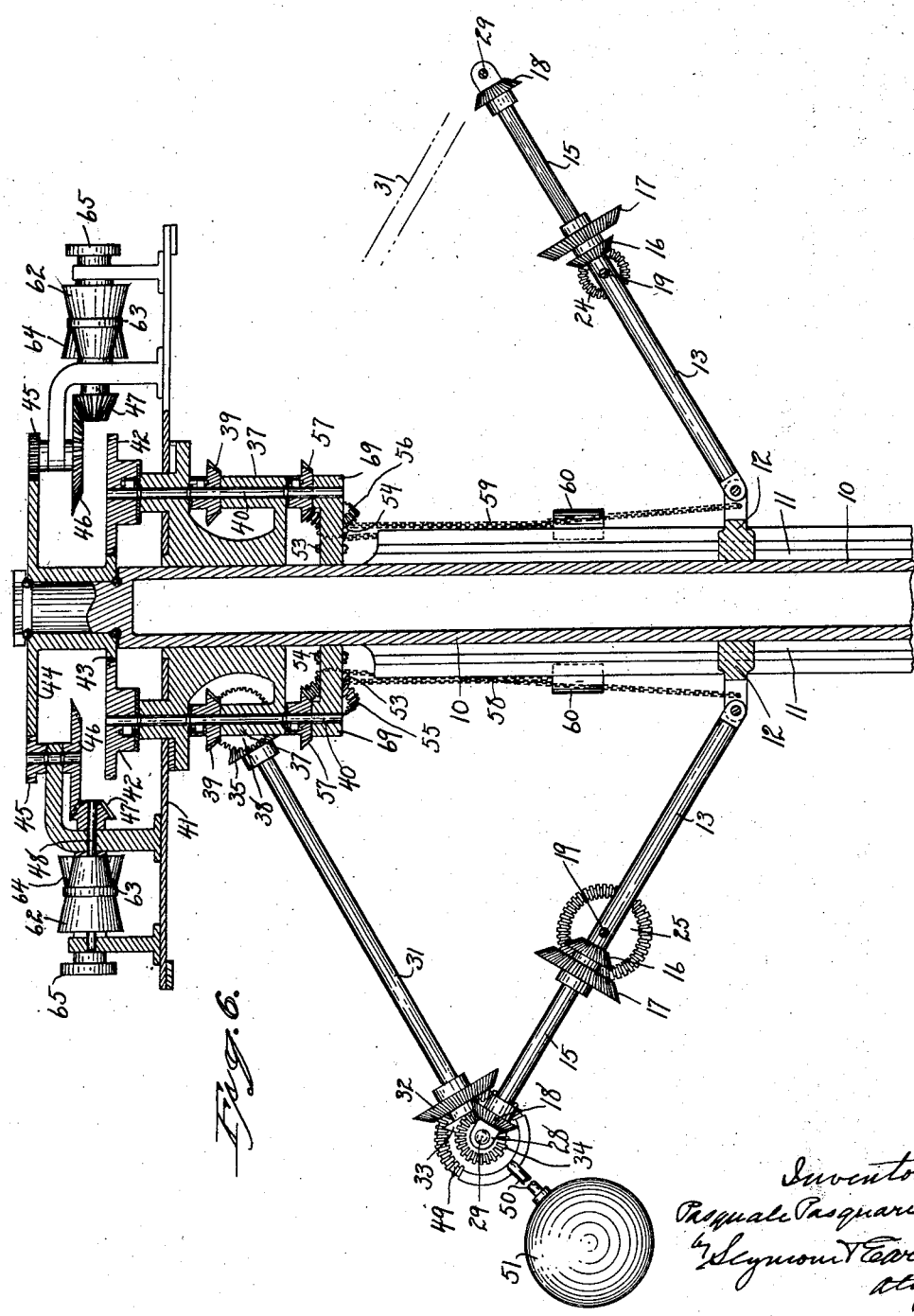

Patented Mar. 3, 1925.

1,528,165

UNITED STATES PATENT OFFICE.

PASQUALE PASQUARIELLO, OF HIGHWOOD, CONNECTICUT.

WAVE AND TIDE MOTOR.

Application filed September 29, 1924. Serial No. 740,504.

*To all whom it may concern:*

Be it known that I, PASQUALE PASQUARIELLO, a subject of the King of Italy, residing at Highwood, in the county of New Haven and State of Connecticut, have invented a new and useful Improvement in Wave and Tide Motors; and I do hereby declare the following, when taken in connection with the accompanying drawings and the characters of reference marked thereon, to be a full, clear, and exact description of the same, and which said drawings constitute part of this application, and represent, in—

Fig. 1 a perspective view of a wave and tide motor constructed in accordance with my invention.

Fig. 2 an enlarged, diagrammatical view, partly in section, of the float-supporting frame and connections therewith.

Fig. 3 a view, partly in section, illustrating one of the wave-floats and its connection with the driving mechanism of the device.

Fig. 4 an enlarged, plan view, showing the sprocket-mountings at the head of the device and connections therewith.

Fig. 5 a plan view of one of the beveled gears, showing the ratchet mechanism.

Fig. 6 a broken, vertical, central section of the upper part of the apparatus.

This invention relates to improvement in wave and tide motors, the object being a simple arrangement of parts, whereby both the waves and tides may be utilized to develop an electric generator, and the invention consists in the details of construction and arrangement of parts as will be hereinafter described and particularly recited in the claims.

In carrying out my invention, I employ a vertically-arranged post 10, suitably anchored in the water below the low point of low tide. This is a rectangular post, and to each of its four sides are fixed ribs 61 which form under-cut grooves 11 for the reception of vertically-movable travelers 12. The device consists of four uniform series of parts, and a description of one side of the device will give a clear understanding of the complete structure. Pivotally connected with the outer end of the traveler 12 is a link 13, the upper end of which is reduced in diameter to form a spindle 14 around which is a sleeve 15 on which are mounted differential ratchet-gears 16 and 17, and at the upper end is fixed a bevel-gear 18. The ratchet-gears 16 and 17 and the term "ratchet-gear" as hereinafter used, may be of any well-known construction, one form being particularly illustrated in Fig. 5, in which friction-rollers 18ª are employed. Extending transversely through the link 13 and fixed to it, is a shaft 19, the ends of which enter tubular sockets 20 connected in cornerblocks 21 and on the shaft between the sockets 20, and on opposite sides of the links are sleeves 22 and 23. Fixed to the sleeve 23 is a pinion 24 meshing with the ratchet-gear 16, and fixed to the sleeve 22 is a bevel-gear 25, meshing with the ratchet-gear 17, and connected with each of the sleeves 22 and 23 are boat-like floats 26 and 27. The upper end of the link is formed with an eye 28 for mounting upon a pin 29 mounted at the lower end of the counter-link 30, on which is a sleeve 31, and mounted on the sleeve are differential ratchet-gears 32 and 33, the gear 33 meshing with a double bevel-pinion 34, with which the gear 18 is engaged. To the upper end of the sleeve 31 is fixed a pinion 35, and the upper end of the link 30 is mounted on a stud 36 supported by a head 37 and carrying double bevel-gears 38 meshing with a bevel ratchet-gear 39 fixed to a vertical shaft 40, which extends upward through a platform 41 and carries a ratchet-gear 42 meshing with a central gear 43, which is connected with a large driving-gear 44, meshing with a gear 45 connected with a bevel-gear 46, meshing with a bevel-gear 47 on a shaft 48 carrying a conical pulley 62 connected by a belt 63 with a conical pulley 64 for adjustably driving a pulley 65 which carries a belt 66 to drive the main shaft 67 of a standard electric generator.

Mounted on the pin 29 is a circular rack 49 and this rack is connected by a stem 50 with a ball-float 51.

A head 69 supports a horizontal shaft 52, and on this shaft are two sprocket-collars 53 and 54, on which are mounted ratchet-gears, 55 and 56, which mesh with a ratchet-pinion 57 on the shaft 40. Over the sprocket-collars 53 and 54 are chains 58 and 59, the ends of the chains being connected with the travelers 12, and supporting counter-balancing weights 60.

The operation of the device is as follows:

The floats 26 and 27 will rock under the action of the waves, and this rocking movement turns the sleeves 22 and 23, turning the pinions 24 and 25, and when moved in either direction will move the ratchet-gears 16 and 17 in one direction, but free to turn in the opposite direction. These ratchet-gears 16 and 17 turn the sleeve 22 and hence the gear 18; this gear 18 turns the double pinion 34 so as to turn the ratchet-gear 33 on the sleeve 31 and hence turn the pinion 35; this pinion turns the double bevel-gears 38, meshing with the ratchet-gear 39 fixed to the shaft 40 and through a train of gears drives the electric generator. As the tide rises and falls, the floats 51, through the rack 49, turn the ratchet-gear 32 on the sleeve 31, and hence through the gear impart movement to the driving-gear 44. As the tide rises, the floats 51 rise, and through the connections with the links 13, lifts the longitudinal supporting-frame, which, owing to the rod and tube construction, is capable of expanding, and as the travelers rise, the counterbalancing weights 60 fall, and in falling drive the sprocket-collars 52 and 54, thus turning the ratchet-gears 55 and the ratchet-pinion 57 and applying power to the driving-gear 44. When the tide falls, the floats drop with it, and the parts assume their previous positions to operate by any wave movement and in any state of the tide, and the boat-floats are in position to operate by any wave movement,—thus, the force of the tide and waves is utilized as a driving mechanism for an electric generator.

I claim:

1. A wave and tide motor comprising a vertically-arranged post, travelers vertically movable thereon, an adjustable frame supported by said travelers, said frame carrying a plurality of boat-like floats, the movement of which imparts rotary movement to a gear, and, through a series of gears, with a driving-gear.

2. A wave and tide motor comprising an extensible, rectangular frame, boat-like floats supported thereby, connections operated by said floats for turning a driving-gear, a series of ball-floats, and connections between the same and the said driving-gear.

3. A wave and tide motor comprising a vertically-arranged post, a series of travelers guided for vertical movement on said post, a plurality of sections around said post, each comprising a link pivoted at its lower end with said traveler, and at its upper end to a pin, the said link carrying a sleeve, differential gears mounted on said sleeve, and a ratchet-gear on the upper end of said sleeve, a horizontal shaft supported by said link, sleeves on said shaft on opposite sides of the link, a float connected with each sleeve, and a ratchet-gear also connected with said sleeves, and meshing with the differential gears on the link, a complementary link coupled with the pin at the upper end of the first link, a complementary sleeve on said complementary link, differential gears at the lower end of said sleeve, an intermediate gear between the gears at the adjacent ends of the said links, a ratchet-gear at the upper end of the said complementary sleeve, a driving-gear and a train of gears moved by the ratchet-gear at the upper end of the complementary link.

4. A wave and tide motor comprising a vertically-arranged post, travelers guided for vertical movement thereon, tide and wave operating-means connected with said travelers, a head at the upper end of said post, ratchet sleeves supported by said head, chains connected with said travelers and extending over said sprocket-sleeves and supporting counter-balancing weights, and gearing between said sleeve and a driving gear.

In testimony whereof, I have signed this specification in the presence of two subscribing witnesses.

PASQUALE PASQUARIELLO.

Witnesses:
FREDERIC C. EARLE,
MALCOLM P. NICHOLS.